United States Patent [19]

Torigai et al.

[11] Patent Number: 4,931,025
[45] Date of Patent: Jun. 5, 1990

[54] POSTURE CONTROL DEVICE FOR MARINE VESSELS

[75] Inventors: Katsumi Torigai; Masanori Takahashi, both of Hamamatsu, Japan

[73] Assignee: Sanshin Kogyo Kabushiki Kaisha, Shizuoka, Japan

[21] Appl. No.: 199,245

[22] Filed: May 26, 1988

[30] Foreign Application Priority Data

May 29, 1987 [JP] Japan ................. 62-134080

[51] Int. Cl.⁵ .............................................. B63H 5/06
[52] U.S. Cl. ............................................ 440/1; 440/61
[58] Field of Search ............... 440/1, 2, 900, 88, 50, 440/53, 59, 61, 84, 87, 113; 364/424, 442; 73/178 T; 416/27; 318/558; 244/182, 191, 194; 114/275, 278, 282

[56] References Cited

U.S. PATENT DOCUMENTS

| 3,070,301 | 12/1962 | Sarnoff | 235/151 |
| 3,406,652 | 10/1968 | Meh et al. | 440/61 |
| 3,468,282 | 9/1969 | Wintercorn | 440/53 |
| 4,718,872 | 1/1988 | Olson et al. | 440/1 |
| 4,734,065 | 3/1988 | Nakahama et al. | 440/56 |

*Primary Examiner*—Joseph F. Peters, Jr.
*Assistant Examiner*—Edwin L. Swinehart
*Attorney, Agent, or Firm*—Ernest A. Beutler

[57] ABSTRACT

A number of embodiments of watercraft propulsion unit controls for optimizing watercraft performance and maintaining stability. Performance is optimized in the illustrated embodiments by adjusting the trim angle of the propulsion device and stability is maintained by changing either the trim condition or the speed of the propulsion unit. The desired posture may either be preset in response to an earlier stable condition or may be set upon reaching of optimum performance.

13 Claims, 11 Drawing Sheets

POSTURE CONTROL DEVICE FOR MARINE VESSELS

BACKGROUND OF THE INVENTION

This invention relates to a posture control device for marine vessels and more particularly to an arrangement for controlling the trim position of a watercraft to obtain optimum watercraft conditions and also adjusting the trim condition to maintain the desired posture for the watercraft.

There have been proposed several devices for adjusting the trim of a propulsion unit for a watercraft so as to obtain optimum watercraft running conditions. For example, devices have been proposed for adjusting the trim of the propulsion device so as to maintain the watercraft hull in a planing condition. Other devices adjust the trim so as to obtain maximum acceleration, speed and/or fuel economy. Although such devices are particularly desirable, they fail to take into account the fact that the stability of the watercraft may deteriorate even though the performance of the watercraft in other regards is optimized.

One form of trim control is operative to trim the propulsion unit down fully during initial acceleration and then to gradually trim the propulsion unit up as the speed of the vessel increases. Such automatic devices are advantageous in that they do not depend upon the skill of the operator. In addition, the operator need not direct his energies and attention toward obtaining the optimum trim position in deference to other matters which require his attention. However, as the speed of the watercraft increases, the area of the hull in contact with the water will decrease and the stability of the watercraft may be reduced even though the speed or acceleration is optimized.

It is, therefore, a principal object of this invention to provide an approved arrangement for controlling the trim of a propulsion unit for a watercraft.

It is a further object of this invention to provide a watercraft propulsion unit control that will obtain optimum performance but which also is operative to maintain the desired posture of the watercraft in preference to optimum performance.

It is a still further object of this invention to provide an automatic watercraft trim control wherein trim is optimized and stability is also optimized.

SUMMARY OF THE INVENTION

This invention is adapted to be embodied in a watercraft having a hull and propulsion means carried by the hull for propelling the hull through a body of water and which is supported by the hull for movement through a plurality of trim positions. Power means are incorporated for changing the trim position of the propulsion means and means operate the power means to position the propulsion means at a trim angle to optimize watercraft performance. In accordance with the invention, means are provided for sensing the posture of the hull and for changing the operation of the propulsion means to maintain a desired posture.

DETAILED DESCRIPTION OF THE PREFERRED EMBODIMENTS

Figure 1:
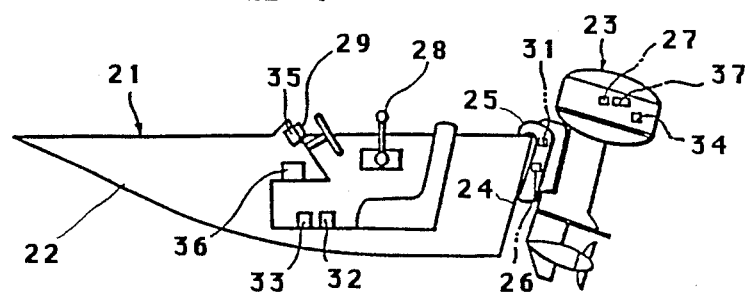
FIG. 1 is a side elevational view of a watercraft constructed in accordance with an embodiment of the invention.

Referring first to FIG. 1, a watercraft constructed in accordance with an embodiment of the invention is identified generally by the reference numeral 21. The watercraft 21 is comprised of a hull 22 that is powered by a propulsion device, indicated generally by the reference numeral 23 and which is, in the illustrated embodiment, an outboard motor. It is to be understood, however, that the invention may be employed in connection with other types of propulsion devices such as inboard-outboard drives or the like.

The outboard motor 23 may be of any known type, and is mounted on a transom 24 of the hull by means including a clamping bracket 25. The clamping bracket 25 is connected to the outboard motor 23 by means of a pivot joint so that the trim angle of the outboard motor 23 may be adjusted. A power operated hydraulic cylinder assembly 26 is incorporated in this mounting arrangement so as to provide a power operation for the trim adjustment. Of course, other forms of trim adjustment may be employed. A relay mechanism 27 is carried by the outboard motor 23 for controlling the cylinder assembly 26 to adjust the tile and trim position. The relay mechanism 27 is controlled manually by means of a manual control level 28 that is positioned within the hull of the watercraft in proximity to the operator's position.

The watercraft 21 is further provided with an automatic trim control mechanism and the device can be switched between manual and automatic mode by means of a selector switch 29 that is also positioned in proximity to the operator's position. In connection with the trim control, there are provided a number of sensors for watercraft condition. These sensors include a trim angle sensor 31, which is mounted in proximity to the clamping bracket 25; a roll sensor 32, which is mounted in the hull 22; a pitch sensor 33, also mounted in the hull 22; and an engine speed sensor 34, mounted in the powerhead of the outboard motor 23.

The control system for the trim angle also includes a desired trim angle setter 35 and a control unit 36. The control unit 36 includes components as may be best seen in FIG. 2 and which will be described later.

There is also provided a throttle 37 in the powerhead of the outboard motor 23 for controlling the speed of the outboard motor 23.

Figure 2:
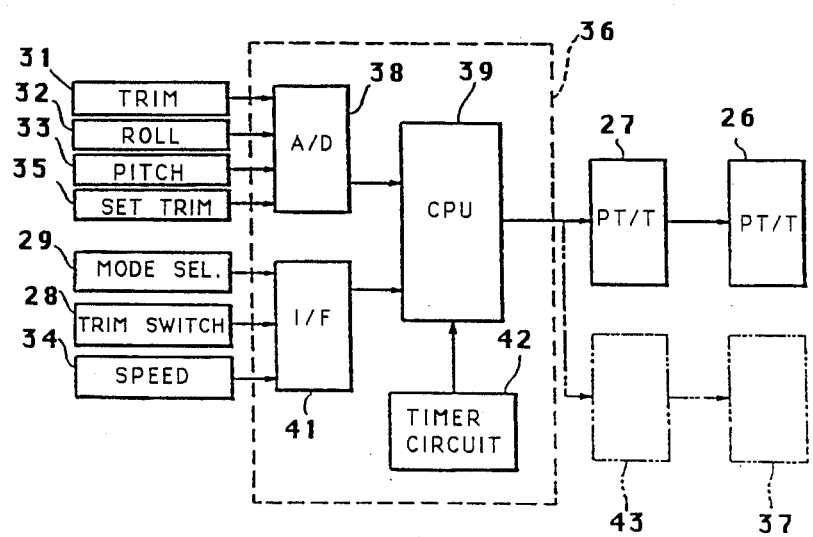
FIG. 2 is a schematic view showing the components of the posture and trim control.

Referring now to FIG. 2, the electronic componentry of the system will be described. The trim, roll and pitch sensors 31, 32 and 33 output their signals to an analog digital converter 38 which forms a portion of the control unit 36. The analog digital convertor 38 converts the analog signals received from the trim, roll and pitch sensors 31, 32 and 33 to a digital signal for transmission to a CPU 39. In addition, the desired trim angle set by the setter 35 is also converted by the analog digital convertor 38 into a digital signal that is transmitted to the CPU 39.

The signals from the mode selector switch 29, trim control switch 28 and the output from the speed sensor 34, which is a digital signal, are transmitted to the CPU 39 through an interface 41. A timer or counter-circuit 42, which may be an oscillator circuit, outputs a time signal or counter signal to the CPU 39 for a purpose to be described.

The CPU 39 outputs a control signal according to the programs to be described to the solenoid valves 27 for controlling the trim unit 26 in any suitable manner. Alternatively, as in conjunction with the third embodiment which will be described, the CPU 39 may control the throttle 31 by outputting a control signal to a throttle control solenoid 43 that operates the throttle 37.

Basically, the CPU is programmed to operate and control the trim angle of the outboard drive so as to obtain optimum running performance. Once optimum running performance is obtained, the system checks the posture and stability of the watercraft and maintains the power unit condition unless the posture becomes unstable. At that time, the power unit condition is changed so as to restore stability. This can be done in a number of different ways and FIGS. 3 through 6 constitute a block diagram showing a first method of operation of the CPU 39 and controls to achieve this purpose.

Because of the size of the block diagram, it is not possible to place it on a single sheet. For that reason, certain numbers are employed in block circles that show how the diagrams interrelate with each other. For example, ① in FIG. 3 indicates that this point in the block diagram continues on to the same circled numeral in FIG. 4. The same is true with respect to the circled numerals ②, ③, ⑩, ⑪, ⑫, ⑳ and ㉚. Each of these numerals indicates that the block diagrams of FIGS. 3 through 6 continue through these points.

Referring now specifically to these Figures and this routine, the first phase 52 of the routine determines whether the system is set so as to be in the automatic trim mode or the manual trim mode as determined by the position of the mode selector switch 29. When the program starts, there is an initial determination made as to whether the mode selector switch 29 is in an automatic or manual setting position. If in the manual setting position, the program returns to manual control. If, on the other hand, the system is in automatic condition, the program moves to a step wherein it is determined if the desired cruising trim condition has been set by the trim setting switch 35.

Once it has been determined that the desired cruising trim angle has been preset by the switch 35, the system operates so as to achieve full trim down of the outboard motor 23 for an acceleration phase. Before actual trim down begins, the system moves to a pause section to wait and make sure that the counter of the timer circuit 42 has been cleared. The system then again ascertains whether or not the mode selector switch 29 is in manual or automatic and if the system is still in automatic mode, there is again made a determination if the preset angle of the trim setting switch 35 has been set. The system then operates to determine if the manual trim switch is on or off. If the manual trim switch is on, the automatic trim circuit is turned off. If, on the other hand, the manual trim switch is turned off, the system then moves to determine if the outboard motor 23 is at its fully trimmed down condition.

If the outboard motor 23 is not fully trimmed down, the system moves to actuate the trim down relay for a predetermined period of time and this procedure is repeated until the outboard motor is fully trimmed down and acceleration is then begun.

The routine then moves to the section indicated by the reference numeral 53 wherein it is determined if the watercraft has reached its planing condition or whatever other present performance condition has be utilized to determine the optimum trim angle for watercraft performance. First, there is made a determination if the speed of the engine is greater than a preset reference speed (for example, a speed such as 3,000 RPM). If the engine speed is not over this speed, the system continues to operate to set the trim angle appropriately. If, on the other hand, the engine speed is over the preset reference speed, the program then moves to a step to determine if the wait counter has counted down. If it has, it is then determined if the angle of the hull (hump angle) is over a preset reference angle which indicates planing of the watercraft. If it is, the program then moves to a step to set the counter and wait for a predetermined period of time (such as two seconds) to prevent operation of the propeller or other propulsion device of the outboard motor 23 from operating so as to cause cavitation. Basically, once the angle is over the predetermined planing angle, the system then moves to the next phase, which is shown on FIG. 4 and which, as has been noted, is a continuation of the point ① in FIG. 3.

During the next phase of operation, indicated by the reference numeral 54, it is determined whether or not the wait counter has counter down and once it has, certain flags are set. Specifically, the flags put up are for auto trim request, reference value measuring request so as to indicate the reference posture of the vessel and a waiting request for a predetermined duration (such as five seconds) after the trim up which will be described later.

At the next stage of operation, indicated by the reference numeral 55, the conditions of the mode selector switch 29, manual trim switch 28, engine speed and preset trim angle setting are again confirmed. If, at the first determination it is determined that the mode selector switch is in manual condition, the system is returned to manual control as this is given preference over automatic control.

If, however, the mode selector switch 29 is in automatic setting, it is then determined whether the engine speed is in excess of or equal to the reference engine speed. If it is not, the system is returned back to the phase indicated by ⑪ and step 53 in FIG. 3. If, however, the engine speed is over the reference speed, it is then determined if the present trim angle by the trim setting switch 35 has been entered. If it has, the system then determines if the actual angle is equal to the reference angle. If it is, the preset trim angle request is cleared and the trim control relays are turned off. If the present trim angle is greater than the desired or preset trim angle, the trim down relay is turned on and if it is smaller, the trim up relay is turned on. In these cases, the process returns to a step between the phases 54 and 55 in FIG. 3B and continues on through the point ② in FIG. 5. This sequence as aforedescribed is indicated by the area 56 in FIG. 4.

Figure 5:
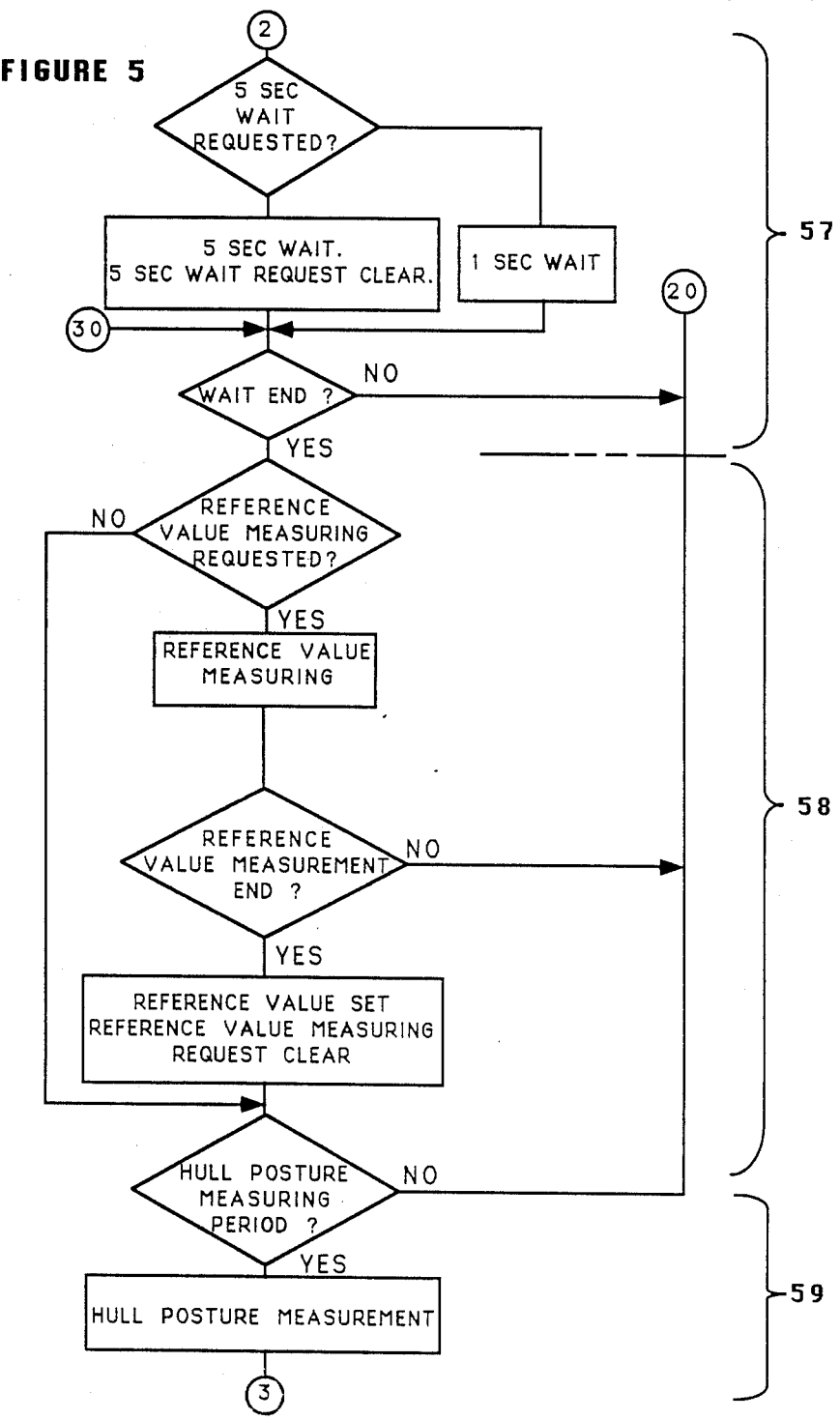
Figure 6:
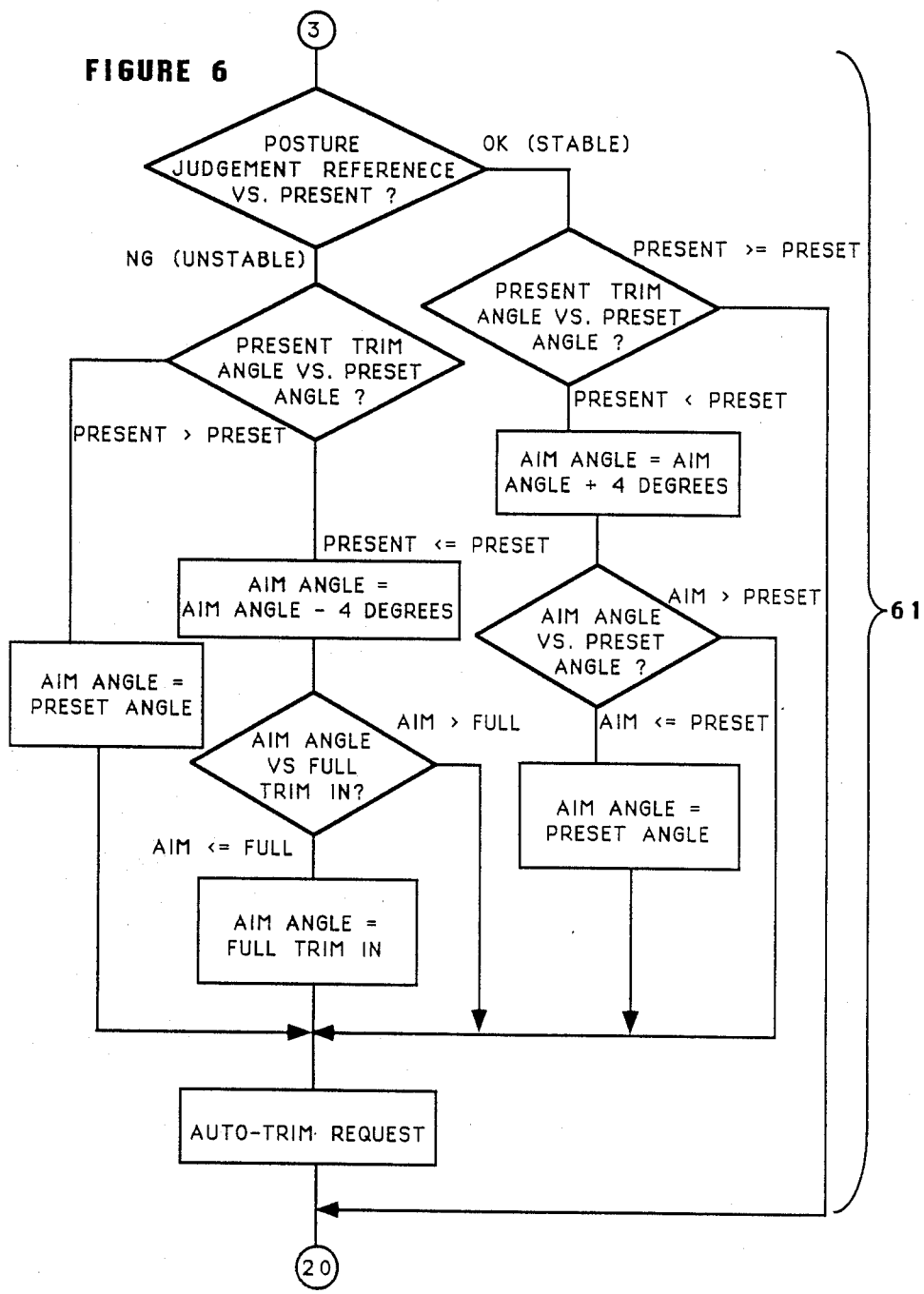

The system then moves to a phase indicated by the area 57 in FIG. 5 wherein a predetermined time interval is waited before the posture of the watercraft is measured after the desired trim angle has been reached. The program first then moves to the point wherein it is determined if the five second wait has been requested. If it has, the wait is counted down and then cleared. If it has not, there is a one second wait set which is then counted down.

Once the waiting period has been run out, the program moves to the phase 58 where the posture of the watercraft is measured if reference value measuring has been requested. The purpose of measuring reference values after a predetermined wait is to assume that the posture of the watercraft after the desired trim angle has been set will be indicative of the appropriate posture of the watercraft.

The reference values of trim, roll and pitch are then measured and memorized. These measured values are then set as reference values and the program moves to the steps 59 where hull posture measurements are continually made and judged against the reference value. From the point ③ at the end of FIG. 5, the program continues on to FIG. 6 at the corresponding point wherein the comparison step appears at the beginning of this block diagram. This segment of the program, indicated at 61, measures the posture of the watercraft and compares it with the presupposed stable posture and will adjust trim angle, in this embodiment, to maintain stability.

For example, at the first step the reference posture is compared with actual posture and if they are the same, stability is assumed and the program continues to move to a continued measuring and comparing function. If, however, at any determination, there is a variation in the posture from the stable posture, it is then determined if the present trim angle is greater than or less than the preset trim angle. If the present trim angle is greater than the preset angle, the program continues on to reset the trim to the preset or desired trim angle. If, however, the trim angle is smaller than the preset angle, it is assumed that trimming down is required to achieve stability and trim down is carried out. This is done in small increments (for example, four degrees) in steps until stability is achieved. That is, the program operates to trim down through four degrees and then compares to determine if stability has been achieved. If it has, the program repeats. If not, however, a further four degree trim down is achieved until stability is obtained.

Once stability is obtained, the system then returns to a phase to optimize performance by pursuing further trim up. That is, when the present trim angle is smaller than the preset trim angle and stability is achieved, the trim angle is again increased in a small increment (for example, four degrees) and this is again continued until the predetermined or preset trim angle is achieved.

After the aforenoted controls, the flag of the auto trim request is again put up and the control returns to the step between the third stage 54 and the fourth stage 55 of FIG. 3B. The trim angle is to be in the full trim state when the engine speed is lowered to the reference speed or lowered by the driver returning the throttle valve of the engine to a lower speed.

Figure 7:
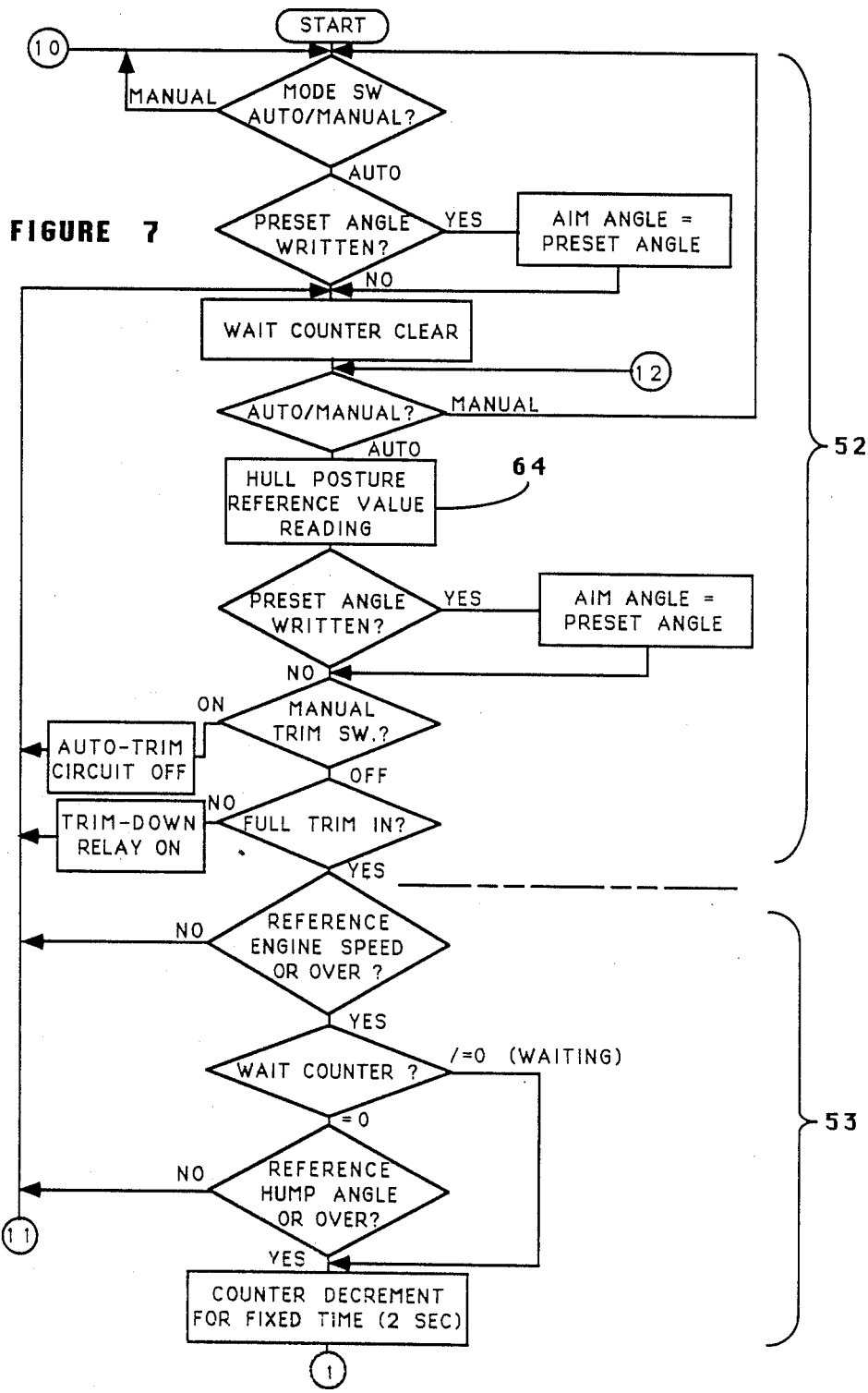
FIG. 7 through 9 are a series of block diagrams showing another embodiment.
Figure 8:
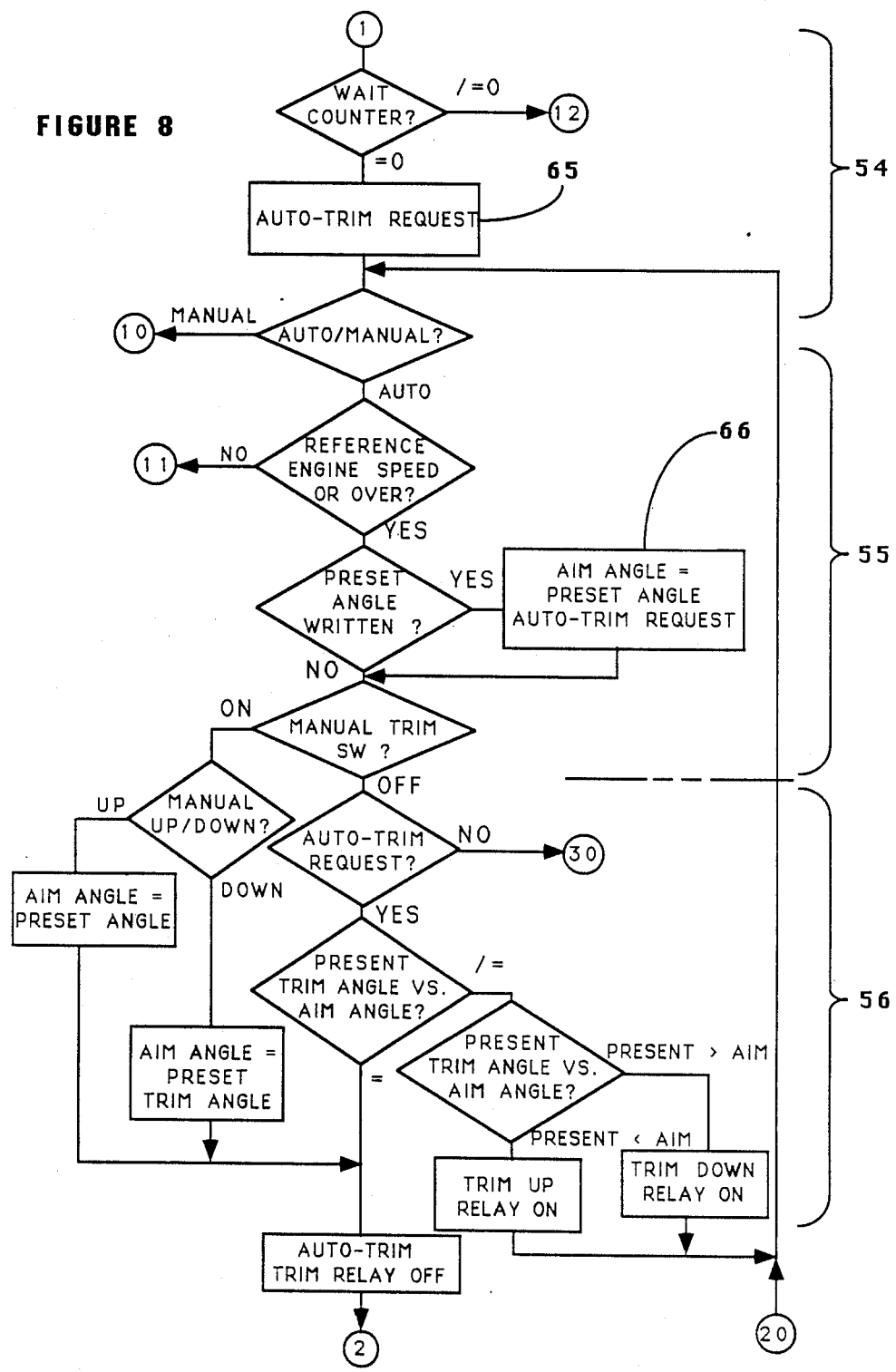
Figure 9:
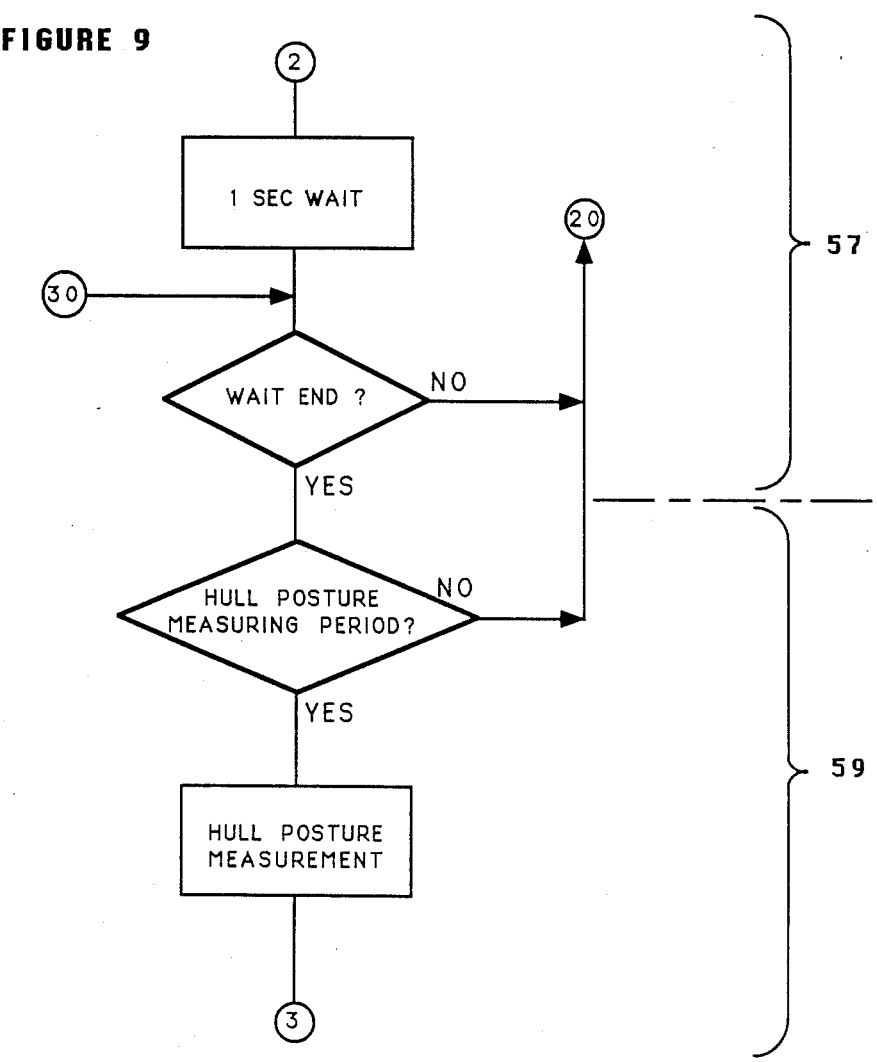

In the routine shown in the embodiment comprised of FIGS. 3 through 6, stable posture was assumed to exist at a predetermined relatively short time period after the desired trim condition had been reached. However, rather than measuring the actual posture of the watercraft under this assumed stable condition in order to determine the reference values for stability, the system may be preset with certain posture values which are determined to be stable. FIGS. 7 through 9 shows such a routine.

Basically, this routine is substantially the same as the routine of FIGS. 3 through 6, with the differences which will be noted. For this reason, those steps in this embodiment which are the same as the steps in the embodiment of FIGS. 3 through 6 have been identified by the same reference numerals and will not be described again. For example, the series of steps indicated by the reference numeral 52 in FIG. 7 are the same as those encompassed by the reference numeral 52 in FIG. 3. However, there is provided an added step 64 after it has been determined that the system is set in automatic mode which step 64 involves making a determination if the hull posture reference value settings have been made. These settings may be placed into the memory of the CPU 39 by the operator once a predetermined stable condition is achieved during some former running of the watercraft. Alternatively, these values may be preset in any suitable manner.

Figure 3:
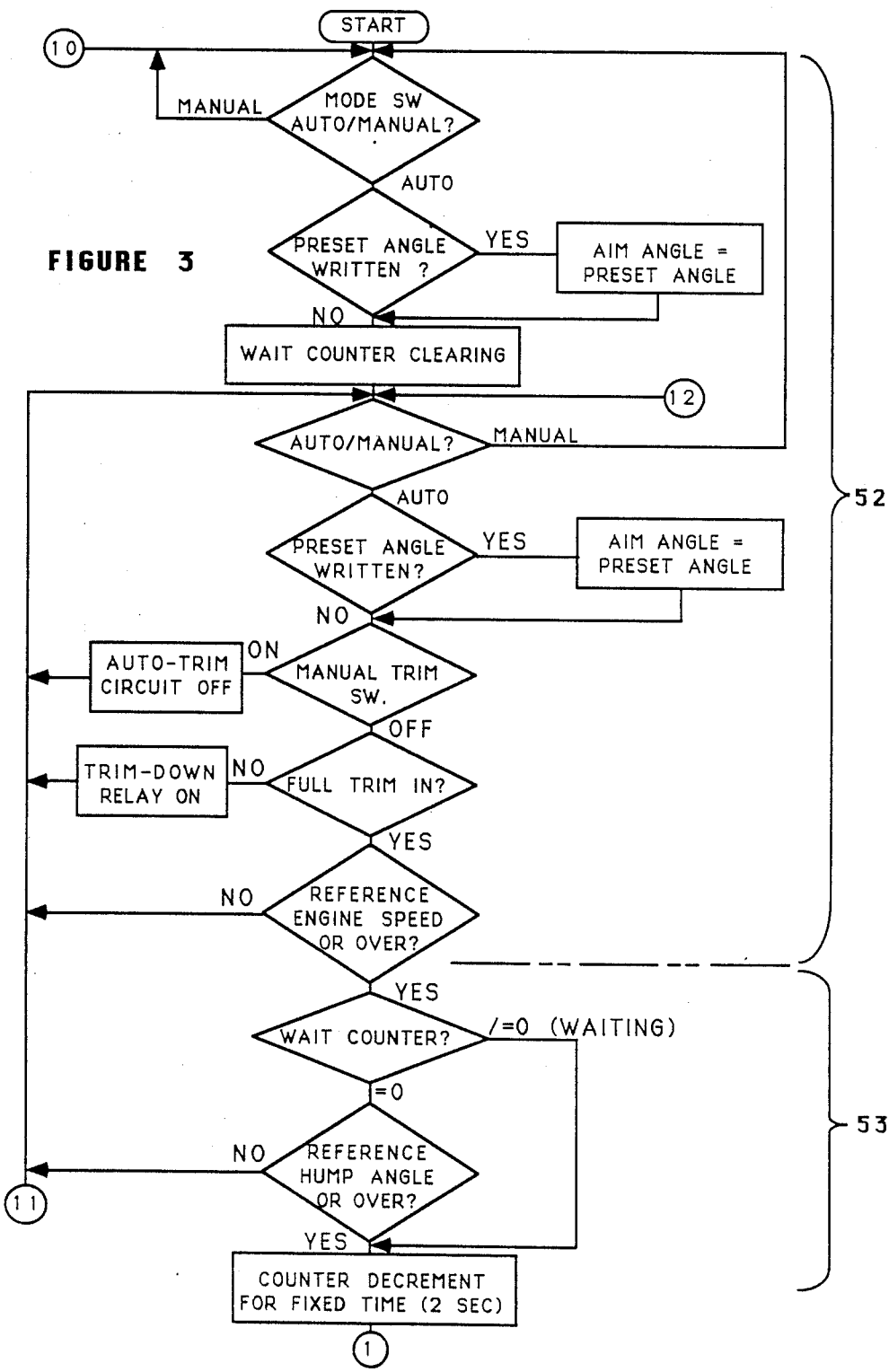
FIGS. 3 through 6 are a series of block diagrams showing a first control sequence for embodying the invention.
Figure 4:
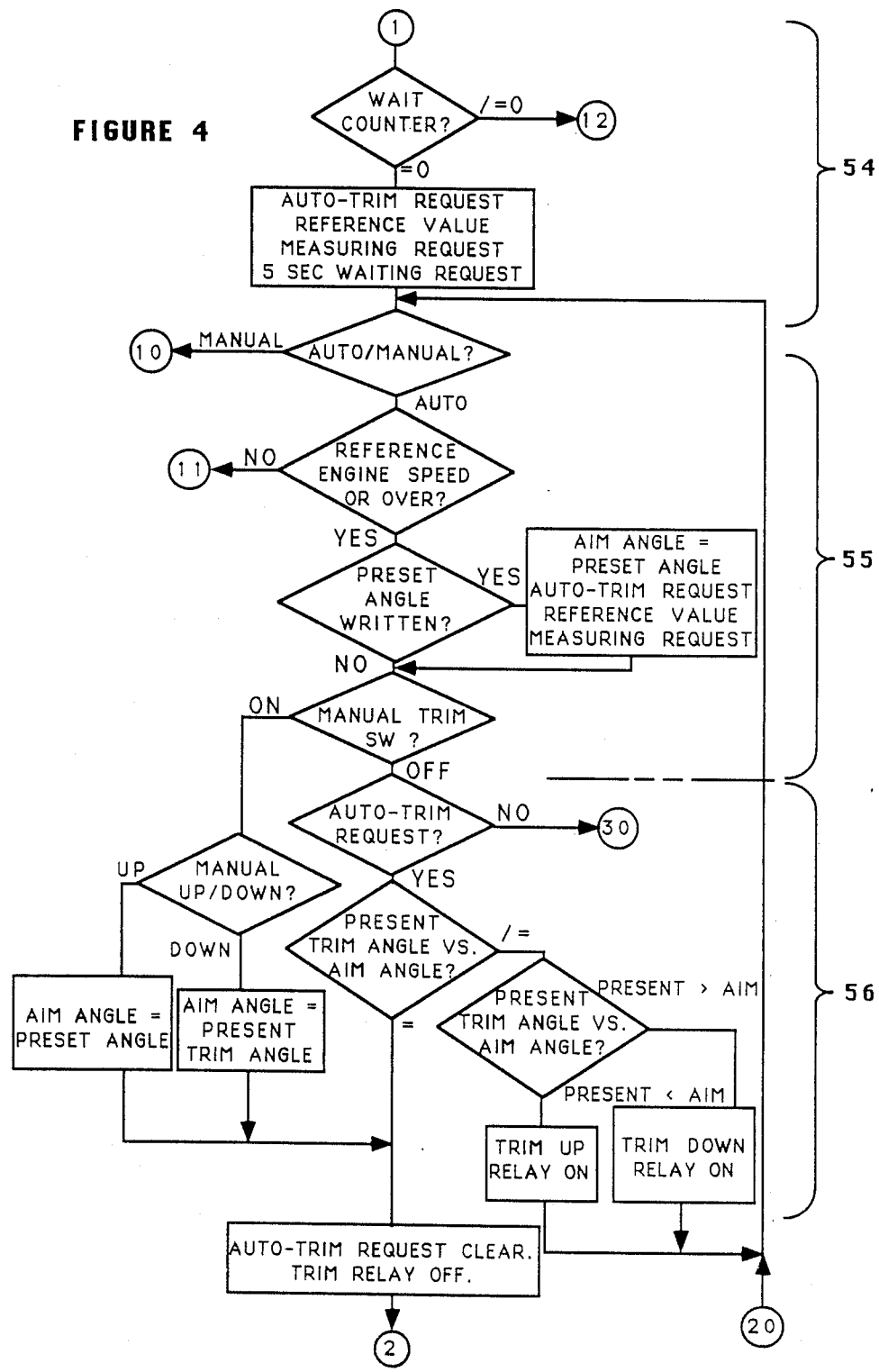

The series of steps 53 in this embodiment is the same as the series of steps 53 in FIG. 3 of the previously described embodiment. The steps 54 and 55 differ from the corresponding steps of the previously described embodiment in that it is not necessary to wait a predetermined time after the desired trim condition has been set in order to measure the desired or presumed stable posture controls. Thus, these steps differ from those previously in including a step 65 which determines if automatic trim has been called for in a step 66 wherein the desired posture or presumed stable posture is compared with the measured posture. In other regards, this program is the same. However, in the stage 57, the five second waiting period is not required, and the entire step 58 of the previous embodiment is not required. In all other regards, the operation of this embodiment and the steps are the same as the previous embodiment as should be readily apparent to those skilled in the art.

Figure 10:
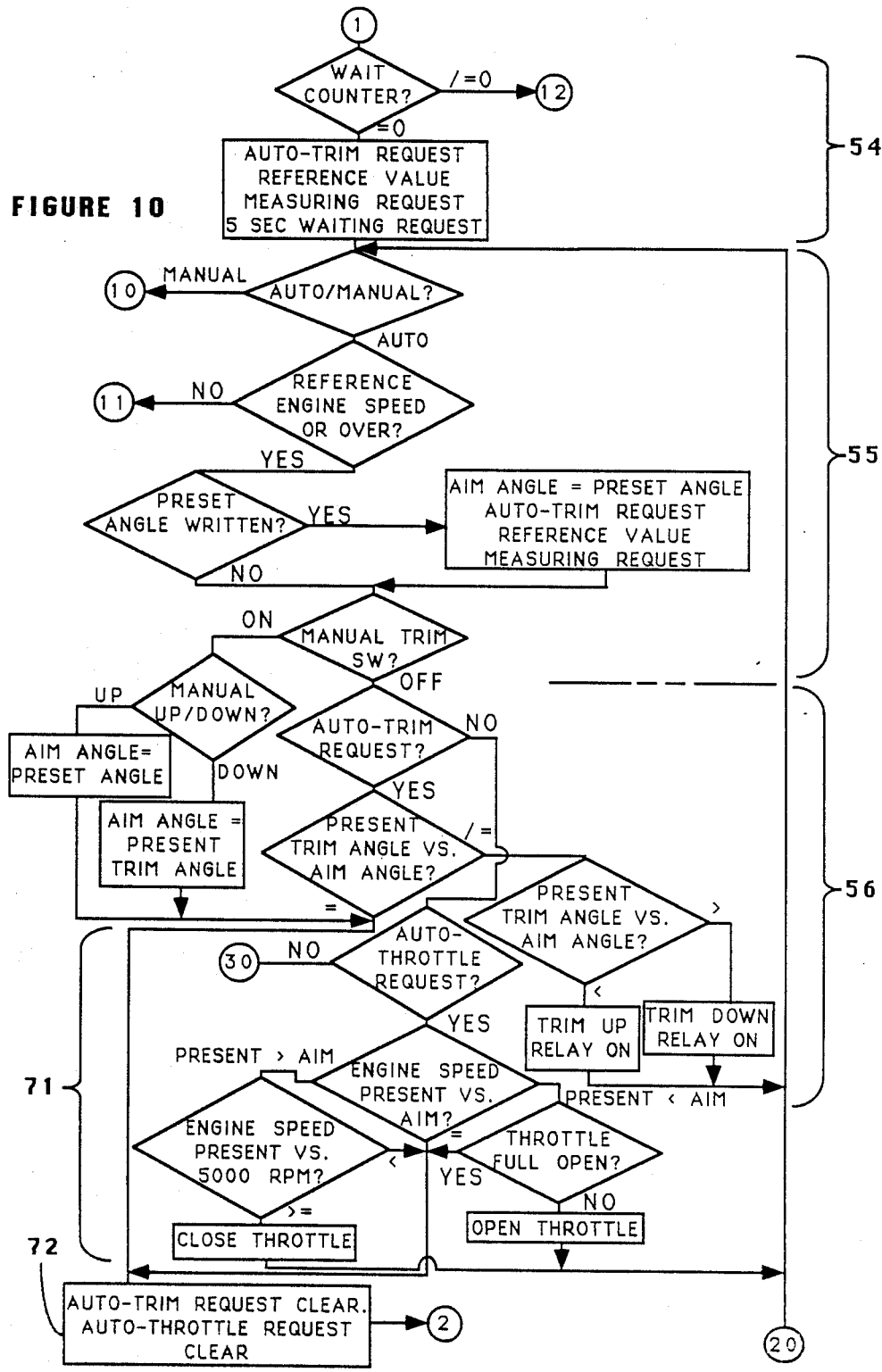
FIGS. 10 though 12 are a series of block diagrams showing a still further embodiment of the invention.
Figure 11:
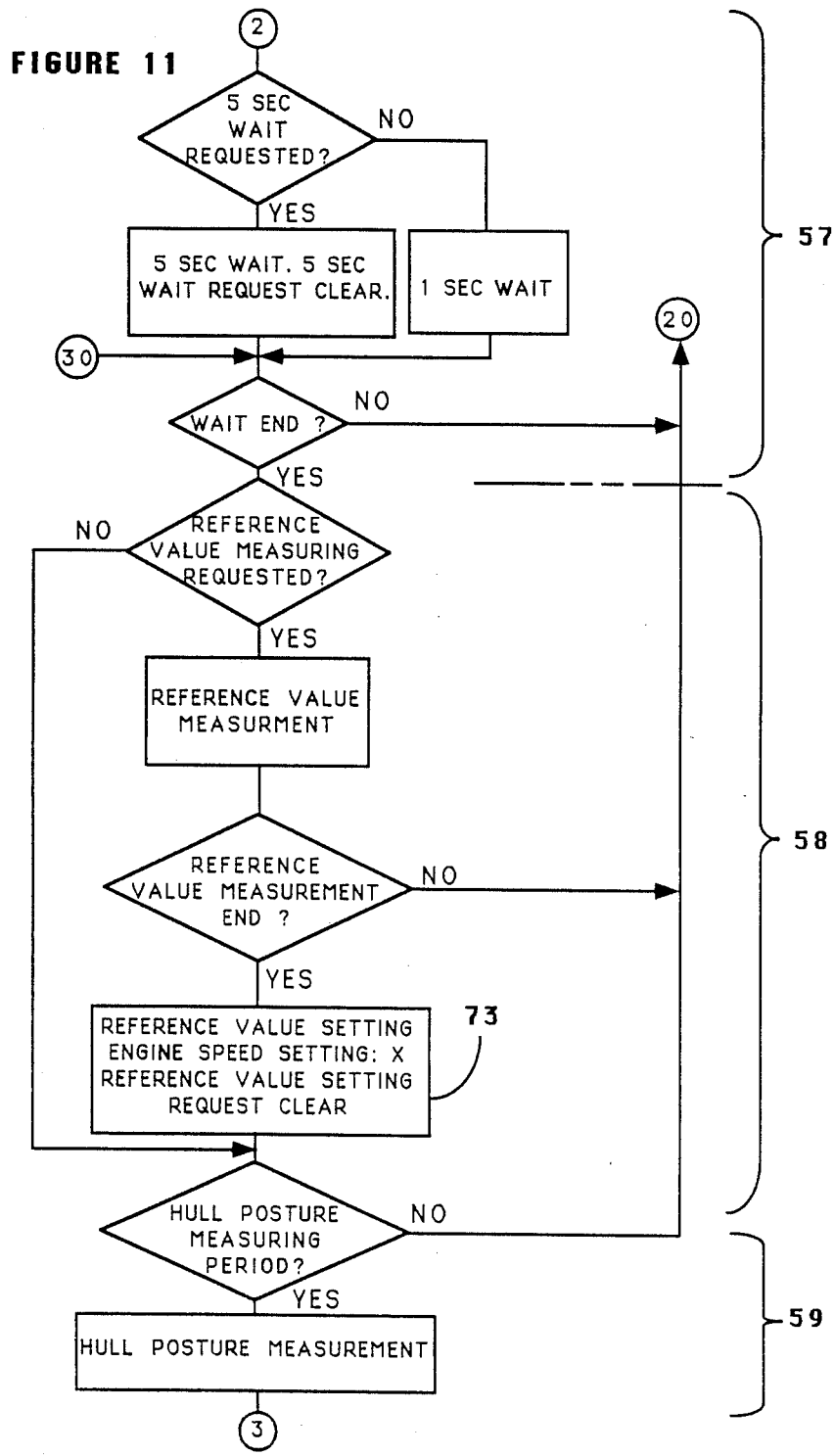
Figure 12:
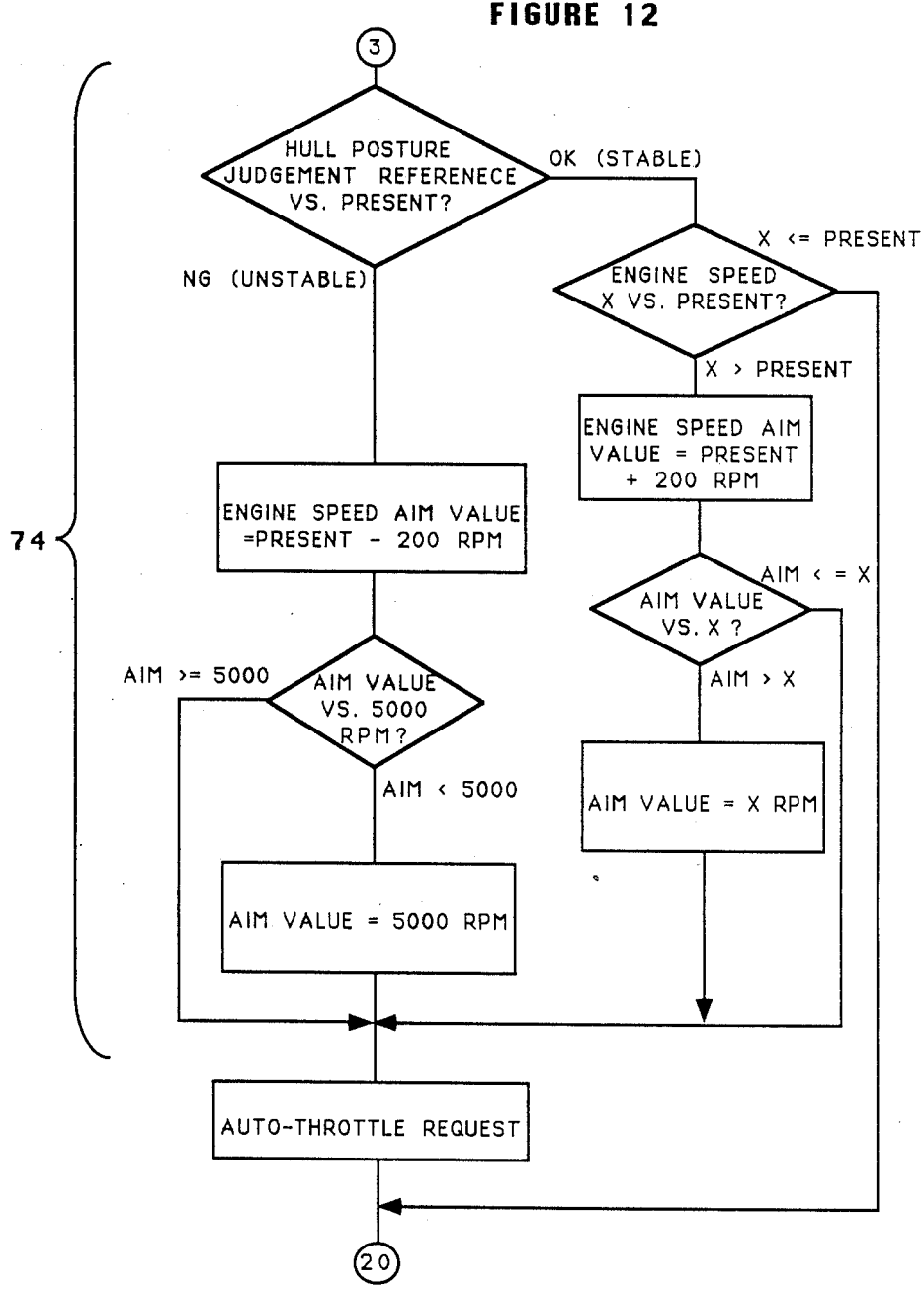

In the two embodiments of computer routines as thus far described, the desired posture of the watercraft has been maintained through adjustment of the trim of the propulsion device. Desired posture may also be maintained by other controls, for example, by controlling the speed of the powering engine. FIGS. 10 through 12 depict such an embodiment as applied to a routine wherein the stable posture is measured by actual watercraft running conditions once the of optimum or desired trim angle has been set and thus parallels the routine set forth in the embodiment of FIGS. 3 through 6. It is to be understood, however, that such a speed modifying posture control may also be employed in connection with a routine as shown in FIGS. 7 through 9 wherein stable posture is determined by the operator presetting the desired criterion either through measurements during previous running or through presetting.

Due to the similarity of the routine of this embodiment to that of FIGS. 3 through 6, it is not believed necessary to describe in full detail all of the steps of the this routine. In fact, the steps 52 and 53 of this embodiment are exactly the same as the corresponding steps of the embodiment of FIG. 3 and, therefore, the description of this embodiment can begin with the routine in the series of steps 56.

In connection with this routine, there is provided a series of steps 71 under which automatic throttle control of the outboard motor or propulsion motor is achieved even when automatic trim is not requested by automatic speed control has been requested. This automatic throttle control compares actual engine speed with preset or desired speed. If the speed is less than the desired speed, and the throttle valve is not fully opened, the throttle valve is continuously opened in steps until the desired speed is reached. If, on the other hand, the speed is greater than the preset speed, the throttle is closed. There is also provided a step 72 under which the automatic throttle control can be cancelled.

The steps 57, 58 and 59 of the previous routine are substantially the same. However, the steps 58 include a step 73 which, in addition to setting the other reference values set the actual speed x.

The final series of steps 74 of this embodiment also compare hull posture with the reference value posture for a stable condition. If the condition is stable, the actual engine speed x is compared with the present engine speed. If the engine speed is less than or equal to the present speed, it is assumed that performance is optimized and the program returns.

If, on the other hand, the actual engine speed x is greater than the preset engine speed, there is set an engine aim speed which equals present speed plus 200 RPM. That is, the engine speed is increased slightly in 200 RPM increments until it is determined that performance has been optimized.

If, on the other hand, it is determined that the hull is unstable due to a difference between the posture readings and the present stable posture readings, stability is achieved by gradual reduction in engine speeds. That its, the engine speed is decreased in 200 RPM increments until stability is achieved. It is presumed that the preset or desired engine speed is 5,000 RPM in this embodiment, however, other speeds may be set.

It should be readily apparent from the foregoing description that a number of embodiments of the invention have been illustrated and described and that each embodiment is highly effective in obtaining optimum watercraft performance and, at the same time, maintaining stability or desired posture of the watercraft. The stable watercraft posture may be determined by either presetting or measuring and stability may be achieved by either modifying the trim condition of the propulsion unit or its speed. Various other embodiments of the invention may be employed than those specifically described, which are only those of preferred embodiments, without departing from the spirit and scope of the invention as defined by the appended claims.

We claim:

1. In a watercraft having a hull, propulsion means carried by said hull for propelling said hull through a body of water, said propulsion means being supported by said hull for movement through a plurality of trim positions, power means for changing the trim positions of said propulsion means, and means for operating said power means to position said propulsion means at a trim angle to optimize watercraft speed, the improvement comprising means for sensing the posture of the hull and means for changing the operation of said propulsion means in preference to the means for optimizing watercraft speed to maintain stability of the posture of said hull after watercraft speed has been optimized.

2. In a watercraft having a hull as set forth in claim 1 wherein the operation of the propulsion means to maintain the desired posture is achieved by changing the trim position.

3. In a watercraft having a hull as set forth in claim 1 wherein the means for changing the operation of the propulsion means to maintain the desired posture changes the speed of the propulsion means.

4. In a watercraft having a hull as set forth in claim 1 wherein the desired posture of the watercraft is preset.

5. In a watercraft having a hull as set forth in claim 4 wherein the desired posture is preset by setting a predetermined stable posture reference value.

6. In a watercraft having a hull as set forth in claim 5 wherein the operation of the propulsion means to maintain the desired posture is achieved by changing the trim position.

7. In a watercraft having a hull as set forth in claim 5 wherein the means for changing the operation of the propulsion means to maintain the desired posture changes the speed of the propulsion means.

8. In a watercraft having a hull as set froth in claim 1 wherein the desired posture is set upon reaching the optimum watercraft performance.

9. In a watercraft having a hull as set forth in claim 8 wherein the operation of the propulsion means to maintain the desired posture is achieved by changing the trim position.

10. In a watercraft having a hull as set forth in claim 8 wherein the means for changing the operation of the propulsion means to maintain the desired posture changes the speed of the propulsion means.

11. In a watercraft having a hull as set forth in claim 8 wherein the setting of the desired posture takes place at a predetermined time interval after the watercraft performance has been optimized.

12. In a watercraft having a hull as set forth in claim 11 wherein the operation of the propulsion means to maintain the desired posture is achieved by changing the trim position.

13. In a watercraft having a hull as set forth in claim 11 wherein the means for changing the operation of the propulsion means to maintain the desired posture changes the speed of the propulsion means.

* * * * *